United States Patent
Grosse

(10) Patent No.: US 6,205,551 B1
(45) Date of Patent: Mar. 20, 2001

(54) COMPUTER SECURITY USING VIRUS PROBING

(75) Inventor: Eric Grosse, Berkeley Heights, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/015,563

(22) Filed: Jan. 29, 1998

(51) Int. Cl.[7] ................................................. G06F 12/14
(52) U.S. Cl. ........................................................ 713/201
(58) Field of Search .......................... 708/135; 709/224; 713/200–201; 714/715, 716, 748

(56) References Cited

U.S. PATENT DOCUMENTS

| 5,361,359 | 11/1994 | Tajalli et al. ........................ 395/700 |
| 5,414,833 | 5/1995 | Hershey et al. ..................... 395/575 |
| 5,440,723 | 8/1995 | Arnold et al. ....................... 395/181 |
| 5,473,769 | 12/1995 | Cozza ................................... 395/183.15 |
| 5,550,984 | 8/1996 | Gelb ..................................... 395/200.17 |
| 5,613,002 | 3/1997 | Kephart et al. ..................... 380/4 |
| 5,623,600 | * 4/1997 | Ji et al. ................................ 395/187.01 |
| 5,623,601 | 4/1997 | Vu ........................................ 395/187.01 |
| 5,706,507 | 1/1998 | Schloss ................................. 395/615 |
| 5,815,571 | * 9/1998 | Finley .................................. 380/4 |
| 5,832,208 | * 11/1998 | Chen et al. .......................... 395/187.01 |
| 5,889,943 | * 3/1999 | Ji et al. ................................ 395/187.01 |
| 5,948,104 | * 9/1999 | Gluck et al. ......................... 713/200 |
| 5,960,170 | * 9/1999 | Chen et al. .......................... 395/183.14 |
| 5,961,644 | * 10/1999 | Kurtzberg et al. ................... 713/200 |
| 5,987,610 | * 11/1999 | Franczek et al. .................... 713/200 |
| 6,009,475 | * 12/1999 | Shrader ............................... 709/249 |
| 6,041,041 | * 3/2000 | Ramanathan et al. .............. 714/25 |

\* cited by examiner

*Primary Examiner*—David A. Wiley
(74) *Attorney, Agent, or Firm*—Donald P. Dinella

(57) ABSTRACT

A technique for determining whether particular clients within a computer network are universally configured in accordance with the desired network security features of the computer network. A probe is randomly inserted within incoming files, e.g., at a firewall in the computer network. The probe is configured as a function of a particular execution task, e.g. a known virus, such that in a properly configured client the probe will not execute and the firewall does not detect a security breach. However, if the client is misconfigured, i.e., not in compliance with the standard network security features, the probe will execute and trigger an alarm in the firewall indicating that the client is vulnerable to a security breach. Advantageously, a network security administrator can take appropriate action to correct those clients which are misconfigured.

28 Claims, 2 Drawing Sheets

COMPUTER SECURITY USING VIRUS PROBING

FIELD OF THE INVENTION

The present invention relates to network security and, more particularly, to a technique for the verification of security measures employed in computer networks.

BACKGROUND OF THE INVENTION

Advances in communications technology and the availability of powerful desktop computer hardware has increased the use of computers to access a variety of publicly available computer networks. Today, a tremendous amount of information is exchanged between individual users located around the world via public computer networks, e.g., the Internet. One class of users includes private individuals and professional users interconnected via a private network, e.g., a corporate intranet. The exchange of information between private and public computer networks has presented a variety of critical security issues for the protection of information on the private computer networks and the overall functionality of the private computer network itself.

Computer network security, at a minimum, is directed to ensuring the reliable operation of computing and networking resources, and protecting information within the network from unauthorized disclosure or access. Various security threats exist which pose increasingly difficult challenges to such network security. In particular, some of the most sophisticated types of security threats are posed by programs which exploit certain vulnerabilities within network computing systems. To name a few, these program-related security threats include well-known logic bombs, trapdoors, trojan horses, viruses and worms, as described, e.g., by W. Stallings, *Network and Internetwork Security Principles and Practice,* Prentice-Hall, Inc., Englewood Cliffs, N.J., 1995. Such well-known software program threats either work independently (e.g., worms) to achieve their desired security breach, or require the invocation of a host program to be invoked to perform the desired disruptive actions (e.g., trapdoors, logic bombs, trojan horses or viruses.) Indeed, there are numerous well publicized accounts of such programs being used to improperly breach the security of private computer networks and cause severe damage (see, e.g., J. Hruska, *Computer Viruses and Anti-Virus Warfare,* Second edition, Ellis Horwood Limited, New York, 1992.) Such damage has included the destruction of electronic files, alteration of databases, or the disabling of the computer network itself or computer hardware connected to the affected network.

Network administrators responsible for the operation of private computer networks employ a variety of security measures to protect the network from external security breaches such as the introduction of computer viruses. One technique uses so-called firewalls. This security scheme essentially places a separate computer system, i.e., the firewall, between the private network and the public network, e.g., the Internet. These the firewalls are software-based gateways that are typically installed to protect computers on a local area network ("LAN") from attacks by outsiders, i.e., unauthorized users. The firewall maintains control over communications from and to the private network. Essentially, the firewall imposes certain security measures on all users employing the private network. For example, firewalls may block access to new Internet services or sites on the World Wide Web ("WWW") because the security consequences are unknown or not accounted for by the present firewall configuration. One potential installation configuration of a firewall is that WWW clients can no longer directly contact WWW servers. Typically, this proves too restrictive, and network administrators employ so-called "proxy servers". Proxy servers are designed with certain features which provide for the forwarding of requests from WWW clients through the firewall thereby providing communication flow to and from servers on the Internet.

Recently, firewall vendors have included so-called "virus filtering" features to address critical security issues associated with virus infection. More particularly, this virus filtering at the firewall is conceptually similar to well-known virus scanning typically employed on client machines, e.g., personal computers, which reside within a LAN in a conventional client/server arrangement. In such client-based virus detection, virus scanning is accomplished using a program which searches through, e.g., the operating system, executable files, system files, boot records, and memory, of the client looking for the presence of undesirable software entities. Computer viruses are detected by the virus scanner by using previously defined "virus signatures" associated with each virus. The virus signature is typically a fixed-length signature pattern, e.g., a 16 to 24 byte pattern, extracted from the known virus by the vendor of the virus scanning software. The virus scanning software contains a list of signatures for known computer viruses and scans the various files in a particular client looking for a match to a particular virus signature. If a match is found, this entity of the client is "infected" and the user is notified accordingly.

The incorporation of virus filtering within commercially available firewalls provides for virus detection by scanning files transmitted through the firewall. While this provides the firewall with additional network security capabilities, implementing the virus filter at the firewall presents certain operational difficulties which include: (1) a substantial amount of processing must be accomplished at the firewall which degrades network performance through the introduction of latency which affects applications executing in the network; and (2) the firewall itself contains less operational and data intelligence with regard to individual clients in the network which leads to a less precise scan of the incoming data by the firewall as could be accomplished by a client-based virus scanner.

Therefore, given the potential drawbacks in firewall-based virus filtering, most network security administrators opt for providing virus screening in the client machines across the network rather than in the firewall itself. Currently, a number of popular commercial computer virus scanners are used for such client-based scanning. Typically, network security administrators will select a particular commercially available virus scanning program and install the program across all the clients of the network. Of course, the effectiveness of the virus scanning software is as function of the uniformity of installation and periodically updating the virus signature listing used by the software to included newly identified viruses. As will be appreciated, for very large client/server networks the task of ensuring that the virus detection software is universally installed and updated on all clients is significant and not always achievable. A client-by-client inspection is labor intensive and cannot be undertaken on a frequent enough basis to ensure conformity. Therefore, individual users are typically responsible for updating their virus scanning software by, e.g., downloading the most current virus signature listing from a central source. Of course, the lack of diligence and infrequency of such updates by individual users can lead to potential secure breaches within the network.

A need exists therefore for ensuring that network security features are universally configured throughout a computer network.

SUMMARY OF THE INVENTION

The present invention provides a technique for determining whether particular clients within a computer network are universally configured in accordance with the desired security features of the computer network. In accordance with the invention, a probe is randomly inserted within incoming files in the computer network. Illustratively, the insertion of probes occurs in a firewall which separates the computer network from other networks. The probe, in accordance with an embodiment of the invention, is configured as a function of a particular execution task, e.g. a known virus, such that in a properly configured client the probe will not execute and the firewall does not detect a security breach. However, if the client is misconfigured, i.e., is not in compliance with the standard network security measures, the probe will execute and trigger a security alert in the firewall indicating that the client is vulnerable to a security breach. Advantageously, a network security administrator can take appropriate action to correct those clients which are misconfigured.

In preferred embodiments of the invention, the probe is configured as a virus probe in the form of a trojan horse which, if executed, on a client will launch a signal back to the firewall indicating that the client is misconfigured. In further embodiments of the invention, the signal back to the firewall is a User Datagram Protocol ("UDP") packet. In accordance, with a further embodiment of the invention, the virus probe is inserted upon a first Internet access from a particular IP address or browser type, and thereafter virus probes are inserted at random intervals.

DETAILED DESCRIPTION

The present invention provides a technique for determining whether particular clients within a computer network are universally configured in accordance with the desired security features of the computer network. In accordance with the invention, a probe is randomly inserted within incoming files, illustratively, at a firewall in the computer network. The probe, in accordance with an embodiment of the invention, is configured as a function of a particular execution task, e.g. a known virus, such that in a properly configured client the probe will not execute and the firewall does not detect a security breach. However, if the client is misconfigured, i.e., is not in compliance with the standard network security measures, the probe will execute and trigger an alarm in the firewall indicating that the client is vulnerable to a security breach. Advantageously, a network security administrator can take appropriate action to correct those clients which are misconfigured.

Figure 1:
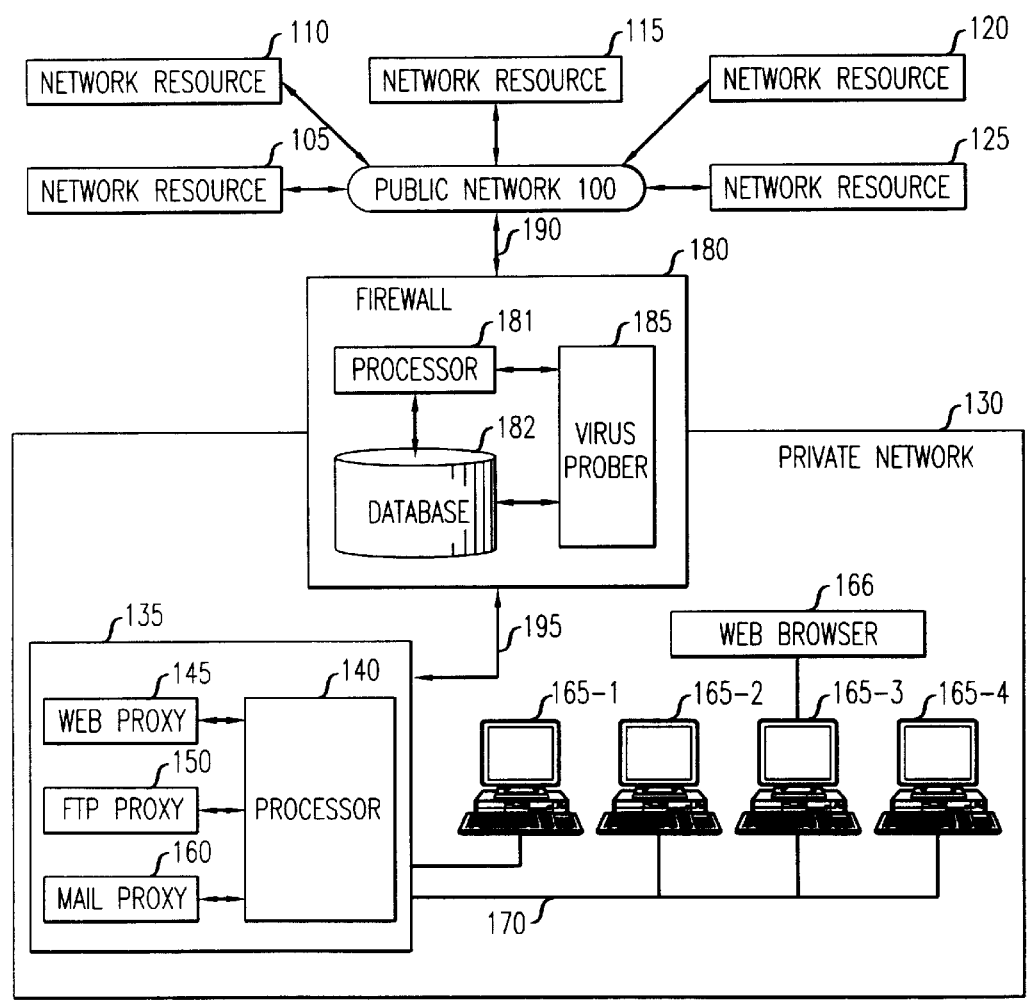
FIG. 1 shows an exemplary system embodying the principles of the invention.

FIG. 1 shows an exemplary system embodying the principles of the invention. As shown in FIG. 1, the system includes public network 100, e.g., the Internet, and network resources 105, 110, 115, 120 and 125. Illustratively, network resources 105 through 125 can be linked together using files written in the well-known Hypertext Mark-up Language ("HTML") thereby representing the well-known WWW. The WWW and HTML are described in more detail, e.g., by B. White, *HTML and the Art of Authoring for the World Wide Web,* Kluwer Academic Publishers, Norwell, Mass; 1996. Illustratively, private network 130 is a network located within a particular user site, e.g., a corporation's headquarters building, having user terminals 165-1, 165-2, 165-3 and 165-4 linked together via LAN 170. As will be appreciated, user terminals 165-1 through 165-4 can be stand-alone personal computers or network terminals. For simplicity of explanation herein, only one such LAN configuration is shown in FIG. 1, however, as will be appreciated private network 130 may include several such LAN configurations similar in nature to LAN 170. A particular user of any one of user terminals 165-1 through 165-4 may cause a client program executing on, e.g., user terminal 165-3, to request certain resources which are available on the WWW, e.g., network resources 105–125. As mentioned previously, such requests to the WWW via the Internet from private network 130 pose certain security risks to both private network 130 and user terminals 165-1 through 165-4. Thus, as shown in FIG. 1, private network 130 includes firewall 180 and proxy server 135 which are configured to delivery certain security features, in accordance with the invention, to protect private network 130 and its various computing resources.

As discussed previously, network administrators responsible for the operation of private computer networks, e.g., private network 130, employ a variety of security measures to protect the network from external security breaches such as the introduction of computer viruses. One technique places a separate computer system, i.e., the firewall, between the private network and the public network, e.g., the Internet. The firewall monitors and maintains control over communications from and to the private network. More particularly, where a private network employs a firewall, the firewall first determines if the requested connection between a user terminal in the private network and the public network is authorized. The firewall serves as an intermediary between the user terminal in the private network and the public network and, if the connection is authorized, facilitates the requisite connection between the two networks. Alternatively, if the connection is unauthorized, the firewall prevents any connection between the networks from occurring.

In accordance with the illustrative embodiment of the invention shown in FIG. 1, proxy server 135 includes processor 140, web proxy 145, file transport protocol ("FTP") proxy 150 and mail proxy 160. As will be appreciated, these illustrative proxies enable the proxy server, working in conjunction with the firewall, to provide security features for WWW/Internet access, file transfers and electronic mail, respectively. For example, web proxy 145 is used when a user desires to access particular "web pages" on the WWW from private network 130. Illustratively, a user employing user terminal 165-3 may access certain web pages on the WWW using web browser 166. Web browsers are well-known software application programs (e.g., Netscape® v. 5.0, available from Netscape Communications) which enable a user to traverse the WWW and access the vast amount of information available throughout the WWW. Thus, web browser 166 receives an input request from the user of user terminal 165-3 and attempts to locate the information on the WWW by establishing a connection with the appropriate resource, e.g., network resource 105, on the WWW through public network 100. The connection between user terminal 165-3 and network resource 105 is established using proxy server 135, web proxy 145 and firewall 180. More particularly, web proxy 145, acting on behalf of web browser 166, will attempt to establish a conventional Transfer Control Protocol/Internet Protocol ("TCP/IP") connection between user terminal 165-3 and network resource 105. As is well-known, TCP/IP is the protocol which is used in describing the way in which information is transferred across the Internet. Essentially, TCP/IP separates information into individual packets and routes these packets between the sending computer, e.g., server, and the receiving computer, e.g., client. TCP/IP and Internet communications are discussed in more detail, e.g., by D. Comer., *Internetworking with TCP/IP*, Third edition, Prentice-Hall, Englewood Cliffs, N.J., 1995. In the present embodiment, the TCP/IP connection between user terminal 165-3 and network resource 105 is made across communication channels 190 and 195, respectively, which establish connection between public network 100, private network 130 and, ultimately, user terminal 165-3.

As seen from FIG. 1, all communications traffic between public network 100 and private network 130 necessarily passes through firewall 180. In recognition of this communications traffic attribute, I have realized that the firewall 180 provides a preferred location for implementing the security advantages of my invention. Illustratively, in accordance with the preferred embodiment of the invention, firewall 180 illustratively includes processor 181, database 182, and virus prober 185 which randomly inserts probes within incoming files from, e.g., public network 100, to, e.g., private network 130. In accordance with the invention, the probes inserted by the virus prober 185 are individual programs which will trigger particular actions upon execution. In accordance with an embodiment of the invention, the probe is a virus probe configured as a trojan horse which, if executed, on a client will launch a signal back to the firewall indicating that the client is misconfigured. Typically, from a computer virus perspective, a trojan horse is a secret, undocumented entry point placed into a useful application program by an unauthorized user, e.g., computer hacker. In the normal course of execution of the useful application program by a user the trojan horse is also executed thereby launching the undesired actions. Trojan horses are described in more detail in Stallings, supra. at pp. 238–241. For example, a trojan horse can be created to gain access to the files of another user on a shared computer system, wherein the unauthorized user creates a trojan horse program that, when executed, changes the authorized user's file permissions so that their files become readable by any user. This embodiment of the invention utilizes particular features of the trojan horse for delivery of various security advantages to computer networks as discussed in more detail below.

In accordance with the invention, the virus probe inserted by virus prober 185 at firewall 180 is benign in that the probe is designed to provide a signal back to firewall 180 if executed, rather than perform some destructive action as in the conventional trojan horse sense as described previously. The security features of the invention are preferably implemented and realized at the firewall, e.g., firewall 180, because in networks where firewalls are employed all communications traffic must pass through the firewall. Thus, the firewall is an ideal location for inserting probes in accordance with the invention. However, will be appreciated, the principles of the invention are also realized in other network environments and configurations. For example, in accordance with a further embodiment of the invention, the insertion of probes can be accomplished using a particular proxy server within a network that is known to have a high rate of common access and is trusted. For example, a trusted server within a private network which mainly provides an online telephone directory is also an excellent candidate for implementing the principles of the invention due to the fact that this server will be utilized by a high number of user within the private network. Thus, the security features delivered by the present invention are realized in a variety of network, hardware and software configurations including, but not limited to, the system configuration of FIG. 1.

Figure 2:
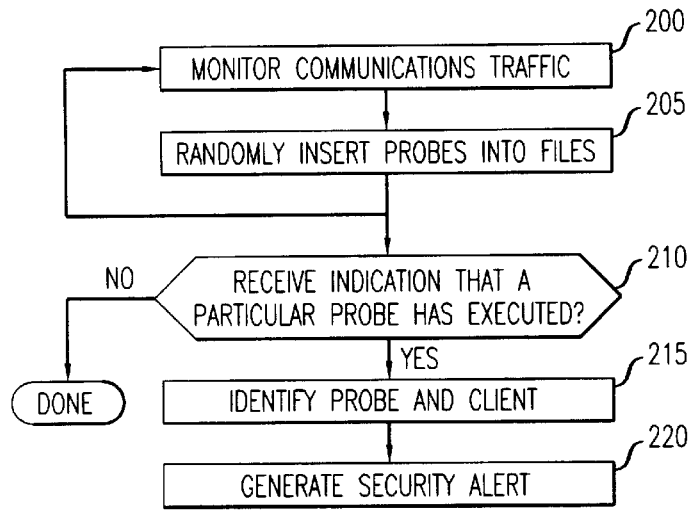
FIG. 2 is a flowchart of operations illustratively performed by the firewall of FIG. 1 in implementing the present invention, and FIG. 3 show an illustrative communications traffic stream transmitted in the system of FIG. 1 and configured in accordance with the invention.

The operations of delivering network security through the insertion, monitoring and execution of probes in accordance with the invention is shown in the illustrative operations of FIG. 2. In accordance with the preferred embodiment of the invention, as described above, the operations of FIG. 2 are initiated within firewall 180. More particularly, in accordance with the invention, the communications traffic stream, e.g., in and out of private network 130, is continually monitored (block 200.) During the course of monitoring the communications traffic stream transmitted across the network, probes are randomly inserted into incoming files (block 205) destined for private network 130. The structural aspects of the probe of the invention are described below in more detail with regard to FIG. 3. In accordance with the invention, the probes are designed, if executed on a client, to trigger a signal indicative of a security alert.

Illustratively, the signal can be a request for a network resource. Since all such requests must be made through the firewall, this ensures that when a probe configured in accordance with the invention triggers such a request, the request can effectively be utilized as the signal to the firewall. That is, such signals triggered by the probe will be immediately recognizable by the firewall. In further embodiments of the invention, the signal can be in the form of a conventional User Datagram Protocol ("UDP") packet. As will be appreciated, UDP is a transport protocol which runs on top of the conventional TCP/IP protocol and provides a low overhead mechanism for two applications to quickly exchange small amounts of data. UDP requires less overhead than typical TCP/IP packet exchanges because UDP is a less secure protocol than TCP/IP. That is, UDP is transaction oriented, and packets may be duplicated, lost or received in a different order than as originally sent. In contrast, TCP/IP is more reliable because the protocol goes to significant lengths (e.g., generating checksums, acknowledging the receipt of packets, retransmitting lost packets) to insure that data arrives at its destination intact. Since UDP has no such overhead it is considerably faster than TCP/IP and is ideal for applications, as in various embodiments of the invention, that transmit short bursts of data, need faster network throughput, or do not require verification of delivery at the destination. As will be appreciated, other types of signal configurations, in addition to those described above, which will be equally effective in delivering the various aspects of the invention.

Thus, when firewall 180 receives the security alert indication, e.g., UDP packet, that a particular probe has executed (block 210), the firewall will identify the probe and client (block 215) and generate the security alert (block 220.) The nature and type of the security alert generated, in accordance with the invention, can be in a variety of forms. Illustratively, the security alert generated by firewall 180 could be an immediate notification to the network administrator indicating that a particular client or clients within the network currently present a security risk. In a further embodiment of the invention, as probes are executed by various ones of the clients within the network, a log entry is made in a master file, e.g. stored in database 182, which can be accessed by the network administrator at regular intervals or a printed report could be generated from the log for review by the administrator.

Advantageously, the invention provides a technique for determining whether particular clients with a computer network are universally configured in accordance with the desired network security features of the computer network. For example, one conventional security measure dictated by most network administrators is a policy that all users within a network, e.g., private network 130, disable certain features of their web browser software, e.g. Netscape®, and in particular the Javascript interpreter feature of the web browser. Javascript is described in more detail, e.g., by D. Flanagan, *Javascript The Definitive Guide,* Second edition, O'Reilly & Associates, Sebastopol, Calif., 1997. Briefly, Javascript is a well-known interpreted programing language useful, e,g., in developing programs which relate to and involve web browsers and HTML. For example, when a web browser includes a Javascript interpreter, the browser enables executable content, e.g., programs, to be distributed over the Internet (and WWW) in the form of Javascript "scripts". When the script is loaded into a Javascript-enabled browser the script is executable and will produce particular output as defined by the Javascript instructions of the script. Thus, Javascript allows for the control over the web browser, and also the content of that which appears in a web page, e.g., HTML forms. As will be appreciated, these features which are enabled through the use of Javascript present serious network security risks.

Figure 3:
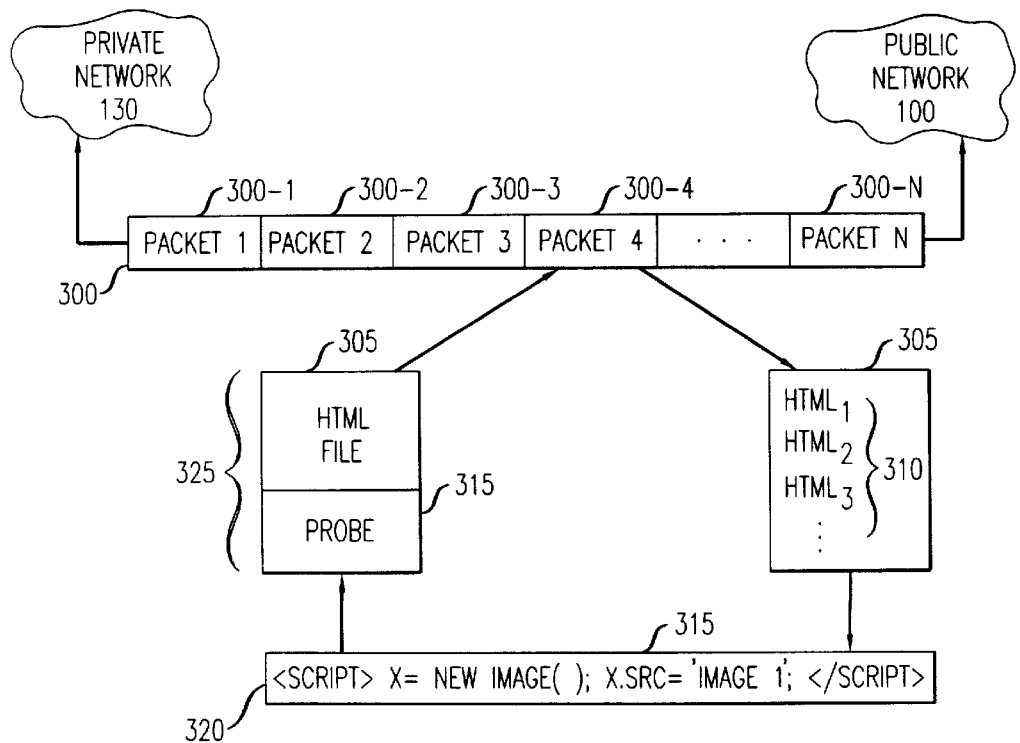

The import of the present invention in the web browser environment described above is detailed in the following illustrative embodiments. Turning our attention to FIGS. 1 and 3, private network 130 includes a plurality of users employing user terminals 165-1 through 165-4. As discussed previously, each user terminal can be configured with a web browser such as web browser 166 executing on user terminal 165-3. As will be readily understood, the configuration of user terminal 165-3 is easily replicated on each of the other user terminals within the private network but for purposes of clarity herein only one such configuration is shown in FIG. 1. Thus, in conformance with the security policy for private network 130, all web browsers are to have their Javascript interpreter disabled to prevent the execution of scripts which may be introduced from foreign sources, e.g., a public network, and subject the private network to various security risks. Of course, such a security measure is only effective if the users of the network comply. Typically, in most private networks there will exist, at any one time, particular user terminals which are not in compliance with the prescribed security measures. Thus, these non-complying user terminals represent a security risk to the entire network and a constant challenge to the network administrator for insuring full compliance with all security measures across the entire private network.

As discussed previously, the invention provides a technique for determining whether particular clients with a computer network are universally configured in accordance with the desired network security features of the computer network. More particularly, firewall 180 is configured, as described above, in accordance with the invention to insert probes into the incoming communications traffic stream to private network 130. FIG. 3 shows an illustrative incoming communications traffic stream 300 and the insertion of an illustrative probe in accordance with the principles of the invention. In particular, communications traffic stream 300 includes a series of individual packets 300-1 through 300-n, e.g., TCP/IP packets, carrying data from public network 100 to private network 130. Thus, in accordance with the invention, firewall 180 monitors communication traffic stream 300 and randomly inserts probes into incoming files within particular ones of the packets. For example, packet 300-4 contains incoming file 305, illustratively a file having a series of HTML instructions 310. In accordance with the invention, virus prober 185 inserts probe 315, illustratively, at the end of HTML instructions 310. In accordance with various embodiments of the invention, probe 315 is inserted upon a first Internet access from a particular IP address (i.e., client) or browser type, and thereafter virus probes are inserted at random intervals. Illustratively, probe 315 is a virus probe in trojan horse form, as previously discussed, wherein the insertion of probe 315 into file 305 results in edited file 325. Thereafter, edited file 325 proceeds in the transmission of communications traffic stream 300 to private network 130.

Illustratively, probe 315 is a single Javascript instruction 320. As shown, Javascript instruction 320 is of the form "<SCRIPT>x=new image( ); x.src='image1';</SCRIPT>" which, as discussed above, is an interpreted scripting language statement for controlling a web browser. Further, illustratively, "image1" is a unique string of characters for identifying probe 315. Basically, probe 315 is a trojan horse which directs the web browser to allocate an off-screen bitmap space, i.e., "new image( )" and download a small image, i.e., "image1". In accordance with various embodiments of the invention, the probes can either be stored in database 182 for access by virus prober 185 or stored locally within virus prober 185 itself In accordance with a further embodiment, probes can be downloaded by network administrators from a central source, e.g., the Internet, and added to the existing probe library. In accordance with the invention, if web browser 166 is in compliance with the illustrative network security feature which requires that all web browsers have their Javascript interpreter disabled, probe 315 will not execute and firewall 180 will not generate any security alert. However, in accordance with the invention if web browser 166 is misconfigured, probe 315 will execute causing web browser 166 to initiate a request for the image file, i.e., image1. As described previously, the mere request by web browser 166, in accordance with an embodiment of the invention, for a network resource is captured by firewall 180 thereby serving as the signal of a security alert. There is no reason for a properly configured web browser to ask for such a network resource, i.e., image1, unless it is improperly configured and outside of established network security measures. That is, execution of probe 315 means that web browser 166 is Javascript enabled which is not in compliance with the desired security measure of the private network 130 and therefore poses a security risk to the network.

As described previously, a further embodiment of the invention employs a UDP packet as the signal back to the firewall when a security alert has occurred. In such an embodiment, file 305 is, illustratively, a file containing certain executable instructions. As is well-known, files having the extension ".exe" are binary executable files. Thus, in accordance with the invention, probe 315 will be inserted into file 305 at an appropriate location where it is known to be safe for overwriting a small number of bytes of file 305 for insertion of probe 315. In accordance with this embodiment of the invention, probe 315 will launch a UDP packet when a security alert occurs. Illustratively, the actual machine instructions inserted into file 305 are generated using, i.e. compiling, the following code segment written in the well-known C programming language:

struct sockaddr_in sin={0,9,{0xF14E8All},0,0,0,0,0,0,0};

int s=socket(PF_INET,SOCK_DGRAM,0);

connect(s,&sin,sizeof(sin));

write(s,0x88,1);

close(s);

As will be appreciated by those skilled in the art, the above illustrative C program segment, after being compiled into machine code, is inserted as probe 315 into file 315 and will generate the desired UDP packet upon probe execution. That is, if probe 315 is executed on a particular user terminal, a UDP packet will be launched to firewall 180 as the signal indicating that the user terminal is a potential security risk.

The foregoing merely illustrates the principles of the present invention. Therefore, the invention in its broader aspects is not limited to the specific details shown and described herein. Those skilled in the art will be able to devise numerous arrangements which, although not explicitly shown or described herein, embody those principles and are within their spirit and scope.

I claim:

1. A computer network security method, the method comprising the steps of:
    monitoring a communications traffic stream of the computer network, the communications traffic stream including a plurality of files;
    inserting a probe into at least one file of the plurality of files;
    determining whether the probe is executed in the computer network; and
    in response to the execution of the probe, identifying a location within the computer network where the execution of the probe occurred.

2. The method of claim 1 further comprising the step of:
    generating a security alert containing at least the identified location within the computer network.

3. The method of claim 2 wherein the identified location is a particular user terminal of a plurality of user terminals within the computer network.

4. The method of claim 1 wherein the inserting the probe step occurs in a server within the computer network.

5. The method of claim 2 wherein the probe is a computer virus configured as a trojan horse.

6. The method of claim 4 wherein the communications traffic stream passes through the server as the communications traffic stream is exchanged between the computer network and a public network.

7. The method of claim 3 wherein the execution of the probe occurs in a web browser running on the particular user terminal.

8. The method of claim 5 wherein the security alert is generated as a function of a UDP packet transmitted by the trojan horse.

9. A method for providing security in a private network, the private network having a plurality of user terminals, the method comprising the steps of:
    monitoring a communications traffic stream between the private network and a public network, the communications traffic stream including a plurality of files, particular ones of the plurality of files destined for particular ones of the plurality of user terminals;
    inserting at least one probe of a plurality of probes into the particular ones of the plurality of files;
    determining whether the probe is executed by the particular one of the user terminals for which the file was destined; and
    in response to the execution of the probe, identifying the particular one of the user terminals in which the execution of the probe occurred.

10. The method of claim 9 wherein the inserting the at least one probe step occurs in a firewall situated between the private network and the public network.

11. The method of claim 10 comprising the further step of:
    transmitting a security alert from the probe to the firewall, the security alert containing an indication of at least the identified user terminal.

12. The method of claim 10 wherein the inserting the at least one probe step occurs as a function of a first access to the public network from at least one user terminal.

13. The method of claim 12 wherein the probe includes at least one Javascript instruction.

14. The method of claim 9 wherein the communications traffic stream comprises a plurality of TCP/IP packets.

15. A method for use in a firewall which provides security between a private network and a public network, the method comprising the steps of:
    monitoring a communications traffic stream transmitted between the private network and the public network, the communications traffic stream including a plurality of packets;
    inserting a probe into at least one packet of the plurality of packets;
    determining whether the probe is executed in the private network; and
    in response to the execution of the probe, identifying a location within the private network where the execution of the probe occurred.

16. The method of claim 15 wherein the private network is a computer network having a plurality of user terminals.

17. The method claim 16 wherein the identifying the location step further comprises transmitting a signal from the probe to the firewall indicating that the probe has executed.

18. The method claim 16 wherein the inserting the probe step occurs as a function of a first access to the public network from at least one user terminal.

19. A network security apparatus comprising:
    a prober for inserting a plurality of probes into a plurality of packets exchanged between a private network and a public network; and
    a processor for monitoring the plurality of packets and determining whether particular ones of the plurality of probes are executed in the private network.

20. The network security apparatus of claim 19 further comprising:
    a database for storing the plurality of probes.

21. The network security apparatus of claim 19 further comprising a communications channel for downloading the plurality of probes from a central source.

22. A network security method, the method comprising the steps of:
    inserting a plurality of probes into an incoming communications stream of a private network; and
    monitoring a plurality of user terminals in the private network for a execution of at least one probe of the plurality of probes.

23. The method of claim 22 further comprising the step of:
    generating a report which identifies particular ones of a plurality of user terminals in the private network in which probes have executed.

24. The method of claim 22 wherein the monitoring the plurality of user terminals step further comprises transmitting a signal to a firewall indicating the execution of the at least one probe.

25. The method of claim 24 wherein the inserting the plurality of probes step occurs within a firewall.

26. The method of claim 24 wherein the incoming communications stream is from a public network.

27. The method of claim 26 wherein the inserting the plurality of probes step occurs as a function of a request from the private network for accessing a particular resource within the public network.

28. The method of claim 26 wherein the inserting the plurality of probes step occurs as a function of a first access to the public network from at least one user terminal.

* * * * *